Feb. 20, 1962 J. C. HOGG ET AL 3,021,949
QUILL INSPECTION SYSTEM
Filed Nov. 8, 1960 2 Sheets-Sheet 1
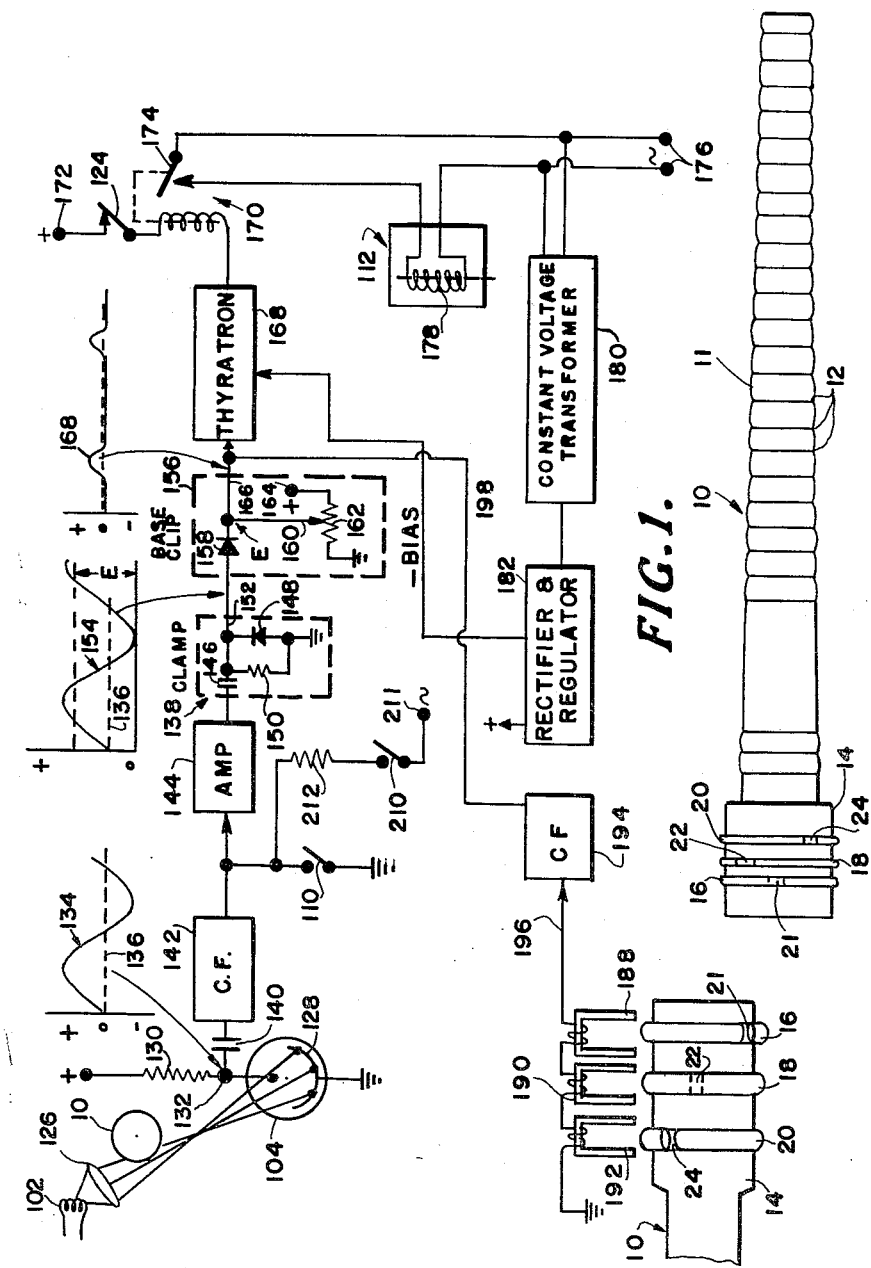
INVENTORS
J.C. HOGG
R.L. PFAFF
BY Cushman, Darby & Cushman
ATTORNEYS

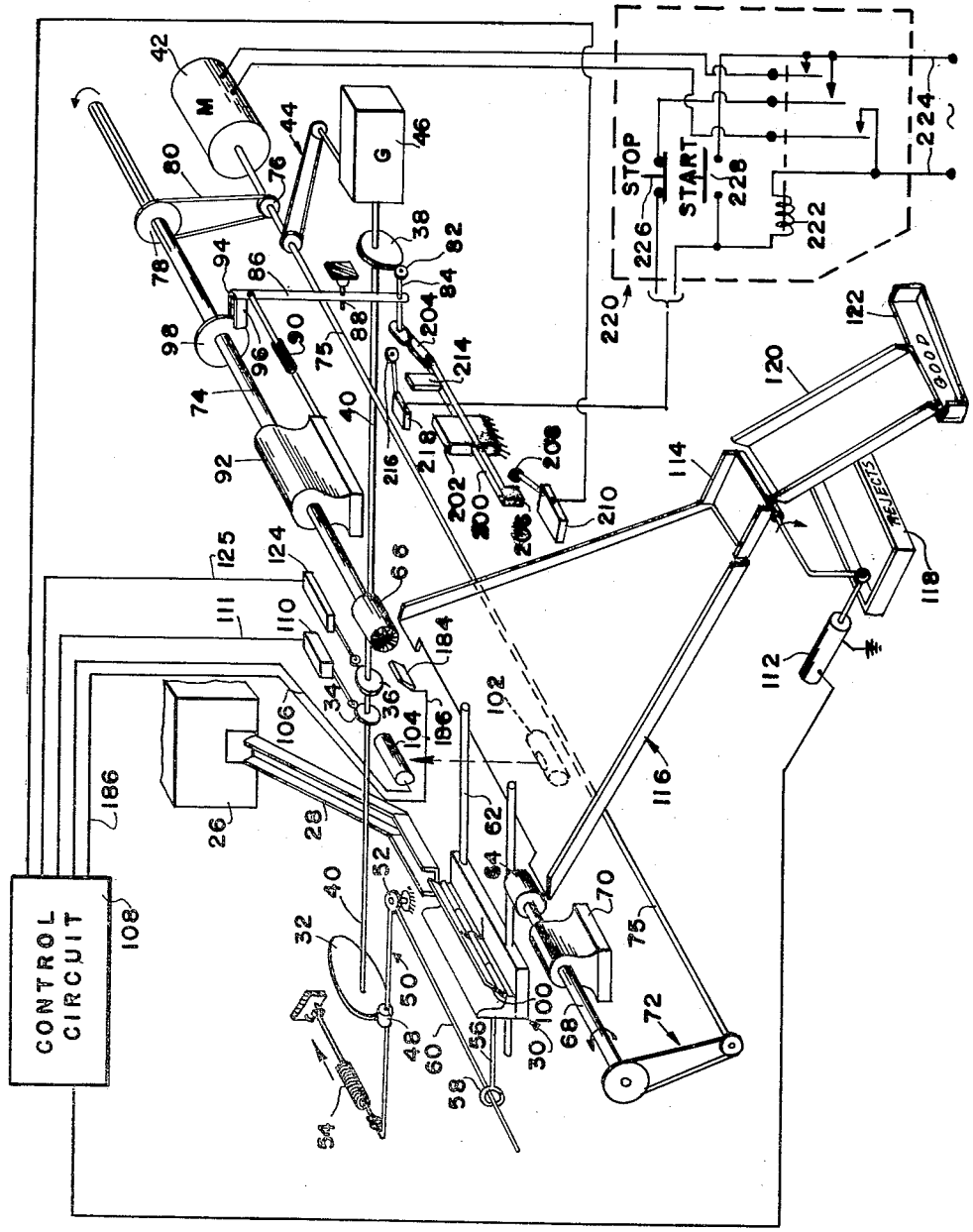

United States Patent Office 3,021,949
Patented Feb. 20, 1962

3,021,949
QUILL INSPECTION SYSTEM
James C. Hogg and Ross L. Pfaff, West Point, Ga., assignors to West Point Manufacturing Company, West Point, Ga., a corporation of Georgia
Filed Nov. 8, 1960, Ser. No. 68,001
21 Claims. (Cl. 209—75)

This invention relates to apparatus for inspecting cylindrical articles, such as textile quills, and gaging them for defectiveness. More particularly, the invention is concerned with quill inspection apparatus for detecting runout, eccentricity, out-of-roundness, deformation, bend, outage, deflection, and the like (all or any of which conditions are hereinafter referred to as "runout"); for detecting any intolerable length quills; and for detecting quills whose base C-rings have a plurality of aligned gaps.

The invention has been found particularly advantageous relative to inspecting and classifying as good or bad, quills of the type used in the textile industry. Though generally applicable to such quills and described in that environment, the invention may be employed to similarly gage other cylindrical articles, such as bobbins and spindles.

By experience it has been determined that successive runout in any quill will cause reduction in the size of the package of filling yarn which can be wound thereon by a quiller, such as the Schweiter Winder; that variations in winding tensions caused by excessive quill runout can effect fabric quality; and that excessive runout can cause yarn to slough off in the shuttle while weaving. For these reasons, amongst others, it is desirable, if not absolutely necessary to inspect quills and reject those which have runout greater than a preset limit. The further undesirability of quills being too long or too short is readily apparent, so those quills of intolerable lengths must also be rejected.

For purposes of placing a quill in a shuttle, each quill is normally provided with three metal, generally steel, concentric split-rings or C-rings spaced longitudinally of the quill around the base or head thereof. Incorrect angular spacing of the ring gaps, i.e., alignment of any two or more gaps, can cause poor alignment of the quill in a shuttle, and may also allow a quill to be erroneously removed from a shuttle during a weaving process because the quill is not tightly enough held in the shuttle when ring gaps are aligned. Accordingly, it is desirable to inspect ringed quills to determine whether the gaps of the rings are out of alignment, as they should be, and reject any quill which has a plurality of its ring gaps aligned.

It is therefore an object of this invention to provide an improved quill inspection device which will indicate those quills that are defective in the way of having excessive runout, intolerable length and/or ring gaps aligned.

Another object of this invention is the provision of means for detecting the total amount of runout of a quill by means for clamping and base clipping a signal representing the runout.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 is an elevation view of a quill with metal rings around its base;

FIGURE 2 is a diagrammatic and schematic illustration of the invention; and

FIGURE 3 schematically illustrates certain electrical circuits for use with the apparatus in FIGURE 2.

The quill 10 in FIGURE 1 is of the type which may be conveniently inspected and classified by the apparatus hereinafter described in detail. Shank 11 may be tapered as illustrated, and generally will include a plurality of circumferential grooves 12 for purposes of better securing and preventing endwise movement of the filling yarn (not shown) when the yarn is wound thereon. At one end, the quill includes a head or base 14 with three circumferential grooves which respectively carry three split-rings or C-rings 16, 18, 20. These rings are made of metal, and when non-deffective, tightly secure themselves in their respective grooves as by inherent spring tension or the like. As will be noted in FIGURE 1, the gaps 21, 22, and 24, respectively in these C-rings are equally spaced about base 14, i.e., 120° apart. They need not be exactly so spaced for considerable tolerance is allowable. At the same time, however, the gaps must never become aligned either during initial installation or due to the rings becoming loose during use, because the performance of the quill is then adversely affected. As is well known, the rings on the base of a quill are employed, in one instance as above indicated, to secure the quill within the spring biased jaws of a shuttle. That is, in a shuttle, there is a pair of opposing, spaced inwardly biased jaws, each of which is grooved (three grooves) to receive the rings on a quill. Though the biasing of these jaws is rather pronounced, the gaps in the rings must not be aligned, or else the jaws can not be effective to hold the quill in proper position strongly enough.

The apparatus illustrated in FIGURES 2 and 3 is such as to automatically inspect successive quills as to (1) runout, (2) alignment of ring gaps, and (3) tolerable length. The quills to be inspected may be held in a hopper 26 which automatically feeds the quills one by one, head last, down chute 28, by means not shown. Carriage 30 catches the quill from the chute, or alternately from a conveyor line as desired, with the hopper or conveyer feeding mechanism being timed with the inspection device either mechanically or electrically as desired, in any manner well known in the art.

Cam 32, which along with cams 34, 36 and 38, is secured to cam shaft 40 and rotated by the action of motor 42, drive 44 and gear box 46, and cooperates with roller 48 to cause bell crank 50 to pivot counterclockwise about point 52 against the action of spring 54. To the rear of carriage 30 is connected a rod 56 which includes at its outer end a hook or ring 58 through which extends an arm 60 of the bell crank. As the bell crank pivots counterclockwise, the carriage 30 slides forward on the fixed rods 62 to a position where the quill being carried by the carriage may be grasped and held by chucks 64 and 66, i.e., to a chucking position.

Chuck 64 which is affixed to shaft 68 rotatably held in bearing 70 and driven by the pulley-belt drive 72 and the extended motor shaft 75, is fixed in a given position along its longitudinal axis, i.e., immovable lengthwise relative to bearing 70. On the other hand, chuck 66 is movable toward and away from the fixed chuck 64 along their common longitudinal axis. Chuck 66 is rotated by virtue of shaft 74 being moved by motor 42 via pulleys 76, 78 and belt 80. As indicated in FIGURE 2, shaft 74 for a distance along its outer end, and pulley 78 are splined so that shaft 74 may move longitudinally with respect to pulley 78. To cause shaft 74 and chuck 66 to move from the predetermined position illustrated in FIGURE 2, i.e., the maximum-chuck-separation position, toward the fixed chuck 64, when carriage 30 is in the proper position for chucking of a quill, the periphery of cam 38 is such as to allow roller 82 to move inwardly toward cam shaft 40. This in turn, via linkage 84, allows rod 86 to pivot leftwardly about point 88, which it does by virtue of the tension of spring 90 connected between rod 86 and bearing 92. The bifurcation at the end of rod 86 forms arms or legs 94 and 96 which are disposed on opposite sides of a disc or collar 98 secured to shaft 74. Consequently, when cam 38 allows spring 90 to pull rod 86 leftwardly, leg 94 pushes against collar 98 and moves shaft 74 along with chuck 66 to cause chucking of a quill then held in the forward-moved carriage 30.

After the chucks close on the quill, carriage 30 is retracted by the releasing action of cam 32 and the pull of spring 54 on bell crank 50 and rod 56, the front lip 100 of the carriage being hinged and spring loaded so it can be forced down by pressure against the chucked quill to allow withdrawal of the carriage from the chucking position back to its illustrated position.

Positioned below the chucked rotating quill is a lamp 102 which directs its light substantially transverse of the longitudinal axis of the chucked quill. Above and on the opposite side of the quill is a light sensing device, such as a photoelectric cell or photocell 104, the output of which is connected by line 106 to the control circuit 108. During the time interval in which the carriage 30 is moved forward and until the carriage is retracted from the quill chucking position, cam 34 maintains switch 110 closed so as to ground out any output from photocell 104. The operation of this switch will become more apparent below during description of FIGURE 3. As the carriage clears the light path from source 102 to photocell 104 during retracting, the short circuiting effect by switch 110 is removed, and the signal generated in the photocell is effectively passed to the control circuit 108. If this signal, which is proportional to he magtniude of runout, is greater than a preset limit, as will be described in reference to FIGURE 3, voltage will be applied to the solenoid 112, so as to cause actuation thereof. Normally solenoid 112, holds the reject gate 114 in its illustrated position, but when actuated rotates the gate, for example clockwise, so that any quill once it is released from the chucks 64 and 66 as below described, and received by chute 116, will fall into a "reject" bin 118 rather than being conveyed through the gate 114 to chute 120 and the "good" bin 122.

As will become apparent in reference to FIGURE 3, the control circuit 108 in FIGURE 2 includes a thyratron, and consequently once the control circuit is energized by a sufficient signal from photocell 104, the thyratron fires and effects actuation of solenoid 112, opening gate 114 to its reject position and causing the gate to remain open even though the signal from photocell 104 subsides, all in accordance with the well known operation of a thyratron.

The continuing motion of cam 38 in FIGURE 2 causes chuck 66 to move rightwardly through the pushing action of leg 96 on collar 98. This releases the quill so that it drops onto apron 116. However, just before the chucks are so separated, switch 110 is again closed by cam 34 to prevent solenoid 112 from being erroneously actuated by the large transient signal which occurs from photocell 104 as the quill is dropped onto apron 116.

As the chucks are being separated in the manner above mentioned, another quill is fed down chute 28 and into carriage 30, which has by that time returned to the position illustrated therefor in FIGURE 2, to start another inspection cycle. Just prior to the grasping of the second quill by chucks 64 and 66, cam 36 is operative to open the normally closed switch 124. As will be apparent relative to FIGURE 3, the opening of switch 124 momentarily interrupts the plate voltage supplied to the thyratron in the control circuit 108 to cause deenergization of solenoid 112, returning gate 114 to its illustrated position.

The operation of control circuit 108 in FIGURE 2, its associated switch, and solenoid 112, may be readily understood with reference to FIGURE 3 in which it should be understood that quill 10 is illustrated in its chucked position between light source 102 and photocell 104. As previously indicated, light source 102, preferably in conjunction with a condenser lens 126, directs light rays substantially transversely to the longitudinal axis of the quill and onto the cathode 128 of photocell 104. In normal fashion the anode of the photocell is connected to B+ via the load resistor 130, the output from the photocell being taken at junction 132. As long as quill 10 has no runout, it will continuously intercept the same number of light rays so that the amount of light which falls on cathode 128 is constant. Under such a condition, there is no voltage variation at junction 132. However, if the quill has some runout, a non-constant amount of light is received by cathode 128. This in turn causes a varying output signal at junction 132 such as is indicated by waveform 134, the reference or zero voltage line 136 referring to the amount of voltage present at junction 132 when the quill has no runout. The signal at junction 132 is coupled to a clamping circuit 138 preferably via a condenser 140, a cathode follower 142, and an amplifier 144. Clamping circuit 138 may be of any well known variety, positive clamping action being preferred, and as illustrated is of the diode type which clamps the lower extremity of waveform 134 to a predetermined base potential such as ground. In particular, clamping circuit 138 includes a series input condenser 146, and the parallel combination of diode 148 and resistor 150 connected between the output line 152 and ground.

Operation of the clamping circuit is such as to cause its output on line 152 to appear as illustrated by waveform 154 the base potential of which is zero volts. Following clamping circuit 138, is a base clipping circuit 156. This circuit may be any conventional base clipping type circuit, and as illustrated includes series diode 158 biased at its cathode end by the positive voltage selected by potentiometer arm 160 as set on the potentiometer resistance 162 which is connected between ground and a positive potential at terminal 164. Whenever the clamped signal on line 152 exceeds the voltage E picked off by potentiometer arm 160, diode 158 conducts current and provides an output line 166 a pulse, such as pulse 168. Variation of potentiometer arm 160 allows for adjustment of the tolerance of runout which a quill may have and still not be rejected. That is, the maximum amount of runout which a quill may have is set by the adjustment of potentiometer arm 160 and the resultant voltage E by which diode 158 is biased is a representation of the maximum allowable runout. The standard signal required for setting the tolerance, may be obtained by rotating a quill which has the maximum amount of allowable runout. Whenever a quill being inspected has more then the tolerable amount of runout a pulse will be obtained on line 166 for each revolution of such a quill. However, the first such pulse is normally sufficient to cause thyratron 168 to fire which effects energization of relay 170 through the normally closed switch 124 by the thyratron plate supply voltage at terminal 172. This in turn closes the relay switch 174 and applies the A.C. line voltage at terminals 176 to the coil 178 of the previously mentioned solenoid 112. As well known in the art and indicated above, once thyratron 168 fires in response to a pulse on line 166, the removal of that pulse does not cause the thyratron to extinguish. Consequently, to effect deactuation of the solenoid coil 178, switch 124 momentarily opens as aforesaid (by action of cam 36 in FIGURE 2), so that gate 114 is returned to its normal (illustrated) position.

Switch 110 of FIGURE 2, which is operative to prevent any indication of runout in a quill, except after the carriage has been retracted from the quill chucking position and before the quill is released, may be coupled between the output of cathode follower 142 in FIGURE 3 and ground. On the other hand, switch 110 need not be so located, but may be coupled any place in the circuitry from junction 132 to and including solenoid coil 178 as desired.

Suitable voltages as required may be obtained from the A.C. voltage at terminals 176 via a transformer 180 and rectifier 182. Preferably, transformer 180 is of the constant voltage variety and rectifier 182 includes a regulator to reduce the sensitivity of the inspection apparatus to line voltage variations.

In the foregoing description of FIGURE 3, it has tacitly been assumed that lamp source 102 was energized by D.C. current, and this is the preferable situation. However, lamp 102 alternatively can be A.C. energized, in which case the photocell signal at junction 132 will contain some ripples which should be filtered out. A representative rotation speed of a quill being inspected is about 30 cycles per second, and if lamp 102 is being A.C. energized, the waveform 134 may include ripples having a frequency of 120 cycles per second. Such ripples are undesirable, and a filter should be included at any desired position along the circuitry, for example, as between cathode follower 132 and amplifier 144. The filter would preferably be of a bridged T type.

As above indicated, the apparatus illustrated in FIGURES 2 and 3 is also capable of inspecting quills as to whether the gaps of the C-rings are aligned. In FIGURE 2, detector 184 with its output line 186 being coupled to control circuit 108 is provided for this purpose. Detector 184 may be a transducer of either the photoelectric type for detecting light changes due to changes of reflectivity between the quill body (normally wood) and the metal rings, or of the capacitance type for detecting the difference in dielectric constant at the air gaps in the rings, or of the magnetic type as illustrated in FIGURE 3.

In FIGURE 3, there is disposed adjacent each of the rings on quill base 14 a different magnetic transducer or pick-up, respectively including open flux path cores 188, 190 and 192. These three cores are aligned in the longitudinal direction of the quill, and each core carries a single winding. All three windings are connected in series between ground and cathode follower 194. In operation, the flux paths for the cores are substantially completed by their respective steel rings when the quill ring gap is in between the legs of the core. In other words, the flux path of each core is interrupted by the respective ring gap, thus causing generation of a pulse for each such interruption. With three rings, the pulses which occur on output line 196 are separated in time by an amount proportional to the angular separation of the gaps in the rings. Because the pick-up coils or windings on the cores are in series, their outputs add, and the occurrence of two or more ring gaps with zero angular separation results in a larger single output on line 196. Cathode follower 194 is biased such that it provides an output over line 198 to thyratron 168 sufficient to cause the thyratron to fire only if the input signal on line 196 to cathode follower is representative of two or more ring gaps being aligned at least substantially. That is, as long as line 196 at any one time carries a signal which represents the detection of only one of the three ring gaps, thyratron 168 will not fire; but on the other hand, if the signal on line 196 represents the detection of a plurality of ring gaps, the resultant signal on line 198 is sufficient to cause thyratron 168 to fire. This in turn operates relay 170 to cause actuation of solenoid 112, and the consequent rotation of gate 114 in FIGURE 2 to its reject position.

In addition to checking quills for runout and alignment of ring gaps, the inspection apparatus of this invention also determines whether or not the overall length of a chucked quill is within tolerance. Equipment for accomplishing this is illustrated in FIGURE 2, and includes slide 200 which is lengthwise movable in the slide guide block 202 in scaled dimension with movable chuck 66. Scaling of the lengthwise movement of slide 200 is effected by linkage 204 which in turn is connected to linkage 84 and roller 82. As cam 38 causes the movable chuck 66 to move from its predetermined outer (illustrated) position longitudinally toward the fixed chuck 64, the slide 200 moves in the opposite direction an amount scaled-down as desired. The forward end of slide 200 includes a downward projecting element 206, which may conveniently be termed a cam, the lower surface or face of which is flat. Cooperating with cam 206 is roller 208 associated with the movable element of a normally closed switch 210. This switch is adjusted in position so that roller 208 is in the center of the lower face of cam 206 when a quill of proper length is chucked. The length of the flat face of cam 206, considered in the sliding direction, is equal (in scale) to the total allowable tolerance in quill length. It can be made adjustable in this length, if desired, by means not shown to accommodate different tolerances. When the lower face of cam 206 and roller 208 is in contact, switch 210 is open. Closure of switch 210 supplies a signal to control circuit 108 to cause gate 114 to be rotated to its reject position in the same manner as above described for a quill with intolerable runout or alignment of ring gaps. As will be noted in FIGURE 3, when switch 210 closes, an A.C. signal such as might be obtained from transformer 180, for example in the order of 6 volts, is coupled from terminal 211 via resistor 212 to amplifier 144. Switch 210 will, of course, be closed during the quill loading discharge cycle, but the input signal path to amplifier 144 is shorted by the closure of switch 110 by cam 34, so the A.C. signal at terminal 211 is consequently then ineffective.

There is further included in the apparatus illustrated in FIGURE 2, a means for stopping motor 42, and consequently the operation of the whole system, when the quill supply in hopper 26 is exhausted or when there is a misfeed or jam. This means includes cam 214 which cooperates with roller 216 attached to the movable element of a normally closed switch 218. This switch is connected to the motor starter or control circuit 220, and is opened by action of cam 214 only when the movable chuck 66 has reached the extreme leftward limit of its closing, which can only occur with no quill between the chucks, to cause motor 42 to stop.

As illustrated in FIGURE 2, switch 218 is in series with the motor-starting relay coil 222. As long as switch 218 is closed as it normally is, the relay switch contacts associated with coil 222 are closed so that the motor supply voltage on lines 224 is applied to the motor. However, if switch 218 is opened by cam 214, or the stop button 226 is depressed, relay coil 222 is deenergized and motor 42 stops. By provision of the start button 228, the motor may be restarted even though switch 218 remains open.

Though the apparatus of FIGURE 2 has been described as using pulley-belt drives, it is apparent that gear-chain drives or other conventional equivalent may be employed instead.

Thus it is apparent that the various objects and advantages herein set forth are successfully achieved. Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for inspecting cylindrical articles such as quills for runout and the like comprising means for rotating a quill about its longitudinal axis, light source means for directing light substantially transverse to said axis, light sensing means disposed to receive a non-constant amount of light when a quill having at least a predetermined amount of runout or the like is rotated by said rotating means for producing a varying output signal due to said runout or the like, means for clamping said varying output signal to a base potential, means for base clipping the clamped signal by a given potential to produce a pulse each time the clamped signal exceeds that given potential, and means responsive to at least one such pulse for indicating when any quill which has at least said predetermined amount of runout or the like has been rotated by said rotating means.

2. Apparatus as in claim 1 and further including means for removing a quill from said rotating means, and means for effectively preventing any indication by the indicating means of such removal of a quill.

3. Apparatus as in claim 1 for further inspecting any quill which carries a plurality of C-rings spaced longitudinally along the quill to determine whether the gaps of a plurality of said rings on any one quill are non-aligned as they should be, comprising detecting means coupled to said indicating means for providing a pulse thereto for each alignment of a plurality of said gaps on a given quill which is being rotated by said rotating means, to cause a quill defective indication by the indicating means.

4. Apparatus as in claim 1 wherein said rotating means includes two rotatable chucking means, means for relatively moving said chucking means toward each other so that they may effectively grasp and hold any quill properly disposed between them while moving toward each other, and means operatively connected with said moving means and connected at its output to said indicating means for gaging the length of a quill so grasped by effectively measuring the distance the chucking means relatively move toward each other before effectively grasping the quill to cause an indication of an improper length quill.

5. Apparatus for inspecting and classifying quill runout and the like comprising means for rotating a quill about its longitudinal axis including two rotatable chucking means, means for relatively moving said chucking means toward and away from each other so that they may effectively grasp and hold any quill properly disposed between them while moving toward each other and release a held quill when moved away from each other, means for delivering a quill into a chucking position when the chucking means are relatively moved away from each other, means for causing the said moving means to operate to move the chucking means toward each other after a quill is delivered to a chucking position to cause the quill to be chucked thereby, means for removing the quill delivering means from the chucked quill, light source means for directing light substantially transverse to the said axis of the chucked rotating quill, light sensing means disposed to receive a non-constant amount of light when a quill having at least a predetermined amount of runout is rotated by said rotating means for producing a varying output signal due to said runout or the like, means for clamping said varying output signal to a base potential, means for base clipping the clamping signal to a given potential to produce a pulse each time the clamping signal exceeds that given potential, means for effectively preventing any such pulse from the clipping means except during the time a quill is being rotated while said quill delivering means is removed as aforesaid from said chucking position, means operative after a quill has been rotated at least once to cause the said moving means to move said chucking means away from each other to release the quill, and means disposed to receive a released quill and coupled to the base clipping means for directing the quill in one direction or another according to whether or not any said pulse was produced by the clipping means.

6. Apparatus as in claim 5 wherein the quill receiving and directing means includes a gate which is coupled to the clipping means by means comprising a solenoid for normally holding said gate in one position to cause a released quill to be routed in a first direction and effectively responsive to any pulse from said clamping means to cause said gate to be moved to a second position for routing a released quill in a second direction.

7. Apparatus as in claim 6 wherein the means coupling the clipping means to said gate includes a thyratron coupled at its output to said solenoid, said thyratron being made operative to actuate said solenoid to move said gate to its second position upon receipt of any pulse from said clipping means, and further including means operative after a quill has been released and routed by said gate for causing said thyratron to deactuate said solenoid.

8. Apparatus as in claim 5 for further inspecting any quill which carries a plurality of C-rings spaced longitudinally along the quill to determine whether gaps of the plurality of such rings on any chucked rotating quill are non-aligned as they should be, comprising detecting means coupled to the quill receiving and directing means for causing the latter to route a quill in the first direction when there is no detection of alignment of said gaps on that quill while it was being rotated and for causing a released quill to be routed in a second direction when the detecting means detects alignment of a plurality of said gaps on the released quill while it was being rotated.

9. Apparatus as in claim 8 wherein said rings are metal and the detecting means comprises a plurality of open flux path aligned cores respectively disposed adjacent said rings on a chucked quill, a winding on each of said cores with said windings being serially connected and coupled to said quill receiving and directing means by means responsive only to the concurrent detection by at least two of said cores of a gap in their respective rings.

10. Apparatus as in claim 5 and further including means operatively connected to said moving means and said quill receiving and directing means for gaging the length of a quill grasped by the chucking means by effectively measuring the distance the chucking means relatively move toward each other to effectively grasp the quill to cause the receiving and directing means to direct a released quill in one direction if the gaging means determines that the quill is of a tolerable length and in another direction if the gaging means has determined that the released quill is of an improper length.

11. Apparatus as in claim 10 wherein the length gaging means includes a slide and means for moving the slide a distance scaled relative to the relative movement of the chucking means toward each other to grasp a quill, said slide having a cam surface of length corresponding in scale to the distance the chucking means may move relatively toward each other to grasp a tolerable length quill, and means associated with said cam to indicate when the slide and cam have moved more or less distance than allowable for a tolerable length quill.

12. Apparatus as in claim 11 and further including means operatively connected with said slide for detecting movement of the chucking means relatively toward each other a distance sufficient to indicate the absence of a quill in chucking position, and means coupled to the detecting means for stopping rotation of the rotating means and the relatively moving means.

13. Apparatus for inspecting and classifying quills which carry a plurality of concentric C-rings, comprising means for rotating such a quill about its longitudinal axis, means for detecting more than a predetermined amount of runout in the quill while it is rotated, means for detecting alignment of the gaps of at least two of said rings while said quill is being rotated, and means coupled to the output of each of said detecting means for rejecting a rotated quill only if either or both of said runout and alignment is or are detected.

14. Apparatus as in claim 13 and further including means for gaging the length of a rotating quill, said rejecting means being also coupled to the gaging means for rejecting a quill of length determined to be improper by the gaging means.

15. Apparatus for inspecting any quill which carries a plurality of C-rings spaced longitudinally along the quill to determine whether the gaps of a plurality of said rings are non-aligned as they should be, comprising means for rotating such a quill, transducer means respectively associated with said rings on the rotated quill for respectively producing a signal each time a respective ring gap rotates past the respective transducer means, means coupled to all of the transducer means for producing an output signal only if at least two signals from respective transducer means concur in point of time, and means responsive to said given output pulse for indicating when at least any two gaps in the rings on a rotated quill are substantially aligned.

16. Apparatus as in claim 15 wherein each of said transducer means includes an open flux path magnetic core with a winding thereon, said cores being aligned in the longitudinal direction of said quill and said windings being connected in series, said rings being metal and being effective except at their respective gaps as part of the flux path for the respective cores whereby the presence of a gap in the open part of a respective core flux path causes induction of a signal in the winding of the respective core with any one such signal being insufficient by itself to operate said indicating means but two or more of such signals when simultaneous being sufficient to operate said indicating means.

17. Apparatus as in claim 16 including means for releasing a quill from said rotating means, means including a gate for receiving and directing a released quill in a first direction or a second direction accordingly to whether said gate is in a first position or in a second position, means coupled to the said means for providing said given output signal and including a solenoid for controlling the position of said gate, said solenoid normally holding said gate in said first position and being responsive to said given output to cause the gate to move to said second position.

18. Apparatus as in claim 17 wherein the said means for providing said given output signal is coupled to said solenoid by actuating means including a thyratron which fires upon receipt of said given output signal and then causes said solenoid to be actuated, and further including means for extinguishing said thyratron and deactuating said solenoid after a quill has been passed through said gate to cause the gate to be returned to its said first position 19. Apparatus as in claim 15 wherein said rotating means includes two rotatable chucking means, means for relatively moving said chucking means toward each other so that they may effectively grasp and hold any quill disposed in a chucking position while moving toward each other, and means operatively connected with said moving means and connected at its output to said indicating means for gaging the length of a quill so grasped by measuring the distance the chucking means relatively move toward each other before effectively grasping the quill to cause an indication by said means by an improper length quill.

20. Apparatus for inspecting quills which respectively carry a plurality of C-rings spaced longitudinally along the quill and rejecting any quill which has more than a predetermined amount of runout, which has a length greater or less than an allowable range of lengths, and which has a plurality of aligned ring gaps, comprising two rotatable chucks aligned along their longitudinal axis, one of said chucks being stationary with respect to movement along its longitudinal axis and the other chuck being removable along its longitudinal axis from a predetermined position toward the stationary chuck and back to said predetermined position, means for rotating said chucks, means including a first cam operatively connected to said rotating means for automatically delivering such a quill to a chucking position, means for moving said movable chuck from said predetermined position toward the stationary chuck to effect chucking of a delivered quill, said cam being effective after chucking of a quill to remove said delivery means from a chucked quill, light source means for directing light substantially transverse to the longitudinal axis of a chucked quill, light sensing means disposed to receive a non-constant amount of light when a quill having at least a predetermined amount of runout or the like is rotated by said rotating means for producing a varying output signal due to said runout or the like, means including a second cam operatively connected to said rotating means for preventing any output signal from the light sensing means until said delivery means is removed from the chucking area, means including a first diode for causing positive clamping of said varying output signal, means including a second diode biased by a given potential for base clipping the clamped signal each time the clamped signal exceeds that given potential, means including a plurality of transducers respectively disposed adjacent the rings of a rotating quill for producing a pulse each time the transducer detects alignment of a plurality of aligned ring gaps, each of said transducers being an open flux path magnetic core having a winding with the windings being serially connected and the transducers aligned in the direction of the longitudinal direction of the chucked quill, means including a third cam operatively connected to said rotating means, a slide, and scaling linkage means between the slide and said third cam for moving said slide a scaled distance in conjunction with the longitudinal movement of said movable chuck, means on said slide for determining the scaled length tolerance of a quill, means disposed adjacent the last mentioned means for causing a pulse upon the chucking of a quill if that quill has a length outside of the length tolerance determined as aforesaid, said third cam being operative to cause the release of the chucked quill, means including a gate for passing a released quill or rejecting same according to whether the gate is in a first or second position, a solenoid normally operative to hold said gate in its first position, a thyratron coupled to receive all of said pulses and to be fired thereby for causing actuation by said solenoid whereby said gate moves to its second position, said second cam being operative to prevent any transient output signal from said light sensing means due to the release of a chucked quill so as to prevent any would-be resulting pulse from said clipping means which in turn might erroneously via said thyratron and solenoid cause said gate to be moved to its second position, and means including a fourth cam operatively connected to said rotating means for causing any necessary extinguishing of said thyratron after a released quill has been passed or rejected by said gate.

21. Apparatus as in claim 20 wherein said rotating means includes a motor and further including a motor control circuit for conditionally supplying electrical energy to said motor, means cooperating with said slide for detecting when said movable chuck moves from said predetermined position toward the stationary chuck a distance sufficient to indicate the absence of a quill in chucking position for causing a signal to said control circuit to stop said motor.

No references cited.